(12) United States Patent
Shin (10) Patent No.: US 8,126,397 B2
(45) Date of Patent: Feb. 28, 2012

(54) ULTRA WIDEBAND COUPLING MECHANISM AND METHOD FOR MOBILE TERMINAL

(75) Inventor: Jong Kyun Shin, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 785 days.

(21) Appl. No.: 11/777,767

(22) Filed: Jul. 13, 2007

(65) Prior Publication Data

US 2008/0090521 A1    Apr. 17, 2008

(30) Foreign Application Priority Data

Oct. 12, 2006   (KR) .................. 10-2006-0099356

(51) Int. Cl.
*H04B 7/00* (2006.01)
(52) U.S. Cl. ........................................ 455/41.2
(58) Field of Classification Search .................. None
See application file for complete search history.

(56) References Cited

U.S. PATENT DOCUMENTS

| | | | |
|---|---|---|---|
| 7,221,961 B1 * | 5/2007 | Fukumoto et al. | 455/557 |
| 7,274,948 B2 * | 9/2007 | Kim et al. | 455/550.1 |
| 2002/0082042 A1 * | 6/2002 | Mark et al. | 455/550 |
| 2005/0113157 A1 * | 5/2005 | Jaakola | 455/575.6 |
| 2006/0002335 A1 * | 1/2006 | Itoh et al. | 370/328 |
| 2006/0031616 A1 | 2/2006 | Chuang | |
| 2007/0037604 A1 * | 2/2007 | You | 455/566 |

FOREIGN PATENT DOCUMENTS

| | | | |
|---|---|---|---|
| JP | 09027984 A | * | 1/1997 |
| JP | 2003209603 A | * | 7/2003 |
| JP | 2005260921 | | 9/2005 |
| KR | 100281533 | | 11/2000 |
| KR | 1020050003166 | | 1/2005 |
| KR | 1020050003166 A | * | 1/2005 |
| KR | 1020050059555 | | 6/2005 |
| KR | 1020060034890 | | 4/2006 |
| KR | 1020060067906 | | 6/2006 |
| KR | 1020060073548 | | 6/2006 |
| WO | WO00/78082 | * | 12/2000 |
| WO | WO 2005027480 A1 | * | 3/2005 |

OTHER PUBLICATIONS

"Samsung SGH-T809 from LetsTalk catalog of Mar. 19, 2006" located at http://web.archive.org/web/20060319163341/www.letstalk.com/landing/search3.htm?landId=24.*

* cited by examiner

*Primary Examiner* — Temesgh Ghebretinsae
*Assistant Examiner* — Gennadiy Tsvey
(74) *Attorney, Agent, or Firm* — The Farrell Law Firm, P.C.

(57) ABSTRACT

An Ultra Wideband (UWB) coupling mechanism and method for a mobile terminal are provided. The UWB coupling mechanism includes a main unit having a first short range communication unit, a memory for storing data received or to be transmitted through the first short range communication unit, a radio frequency unit for establishing a radio channel with a mobile communication system, and a control unit for controlling communication between the first short range communication unit, memory, and radio frequency unit; and a sub-unit having a second short range communication unit for establishing a wireless channel to the first short range communication unit, and a function unit for executing various functions of the mobile terminal.

10 Claims, 8 Drawing Sheets

ULTRA WIDEBAND COUPLING MECHANISM AND METHOD FOR MOBILE TERMINAL

PRIORITY

This application claims priority to an application entitled "ULTRA WIDEBAND COUPLING MECHANISM AND METHOD FOR MOBILE TERMINAL" filed in the Korean Intellectual Property Office on Oct. 12, 2006 and assigned Serial No. 2006-0099356, the contents of which are incorporated herein by reference.

BACKGROUND OF THE INVENTION 1.0 Field of the Invention

The present invention relates to a mobile terminal and, in particular, to an Ultra Wideband (UWB) coupling mechanism and method for a mobile terminal.

2.0 Description of the Related Art

A clamshell-type mobile terminal usually includes a main unit having a main board, keypad, and microphone, a sub-unit containing a liquid crystal display module and a speaker, and a hinge mechanism pivotally coupling the lower and upper bodies. The hinge mechanism is provided with a cable or a Flexible Printed Circuit Board (FPCB) for electrically connecting the lower and upper bodies without obstructing folding and unfolding operations of the mobile terminal. The FPCB is provided in a round loop within the hinge mechanism such that it cannot be seen. However, the cable or FPCB is likely to be damaged due to the twisting and bending stresses caused by frequent pivoting motion of the lower and upper bodies.

Also, since the cable or FPCB is made of a conductive material such as copper, the physical damage to the cable or FPCB causes noise and decreases the data rate between the lower and upper bodies.

Further, the cable or FPCB is connected to the lower and upper bodies using connectors, hence the mobile terminal manufacturing process becomes complex, resulting in reduction of productivity.

SUMMARY OF THE INVENTION

The present invention solves the above problems, and it is an object of the present invention to provide a mobile terminal equipped with an Ultra Wideband (UWB) coupling mechanism and driving method thereof that are capable of coupling separate parts of a mobile terminal such as clamshell or slide type mobile terminal via a wireless UWB link.

It is another object of the present invention to provide a mobile terminal employing a UWB coupling mechanism and driving method thereof that are capable of simplifying the manufacturing process of the mobile terminal by connecting separate parts of the mobile terminal via the wireless UWB link.

In accordance with an aspect of the present invention, a mobile terminal employing an intra wireless coupling mechanism accomplishes the above and other objects. The mobile terminal includes a main unit having a first short range communication unit, a memory for storing data received or to be transmitted through the first short range communication unit, a radio frequency unit for establishing a radio channel with a mobile communication system, and a control unit for controlling cooperation between the first short range communication unit, memory, and radio frequency unit; and a sub-unit having a second short range communication unit for establishing a wireless channel to the first short range communication unit, and a function unit for executing various functions of the mobile terminal.

Preferably, the function unit includes at least one of a keypad, a display, a microphone, a speaker, and a camera.

In accordance with another aspect of the present invention, an intra-wireless coupling method for a mobile terminal including a main unit having a first short range wireless communication unit, a memory unit, a radio frequency unit, and a control unit, and a sub-unit having a second short range wireless communication unit and a function unit for executing various functions under the control of the control unit is provided. The intra-wireless coupling method includes transmitting data signals received from outside and control signals input through the function unit of the sub-unit to the control unit of the main unit; distinguishing the data and control signals according to corresponding units; formatting the data and control signals; and transmitting the formatted data and control signals to the corresponding units through a wireless channel established between the first and second short range wireless communication units.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Certain terminologies are used in the following description for convenience and reference only and are not limiting. In the following detailed description, only the exemplary embodiments of the invention have been shown and described, simply by way of illustration of the best mode contemplated by the inventor(s) of carrying out the invention. As will be realized, the invention is capable of modification in various obvious aspects, all without departing from the spirit of the invention. Accordingly, the drawings and description are to be regarded as illustrative in nature and not restrictive.

The UWB coupling mechanism of the present invention can be preferably adapted to a clamshell or sliding type mobile terminal, which is made up of two separate parts, i.e. a main unit having a keypad and a sub-unit having a display. In the following embodiments, the UWB coupling mechanism of the present invention is described with a slide type mobile terminal as an example.

In the following embodiments, key input data generated by keypad manipulation, image data input through a camera, and other data generated during a wireless communication are expressed by the term "signal."

Figure 1:
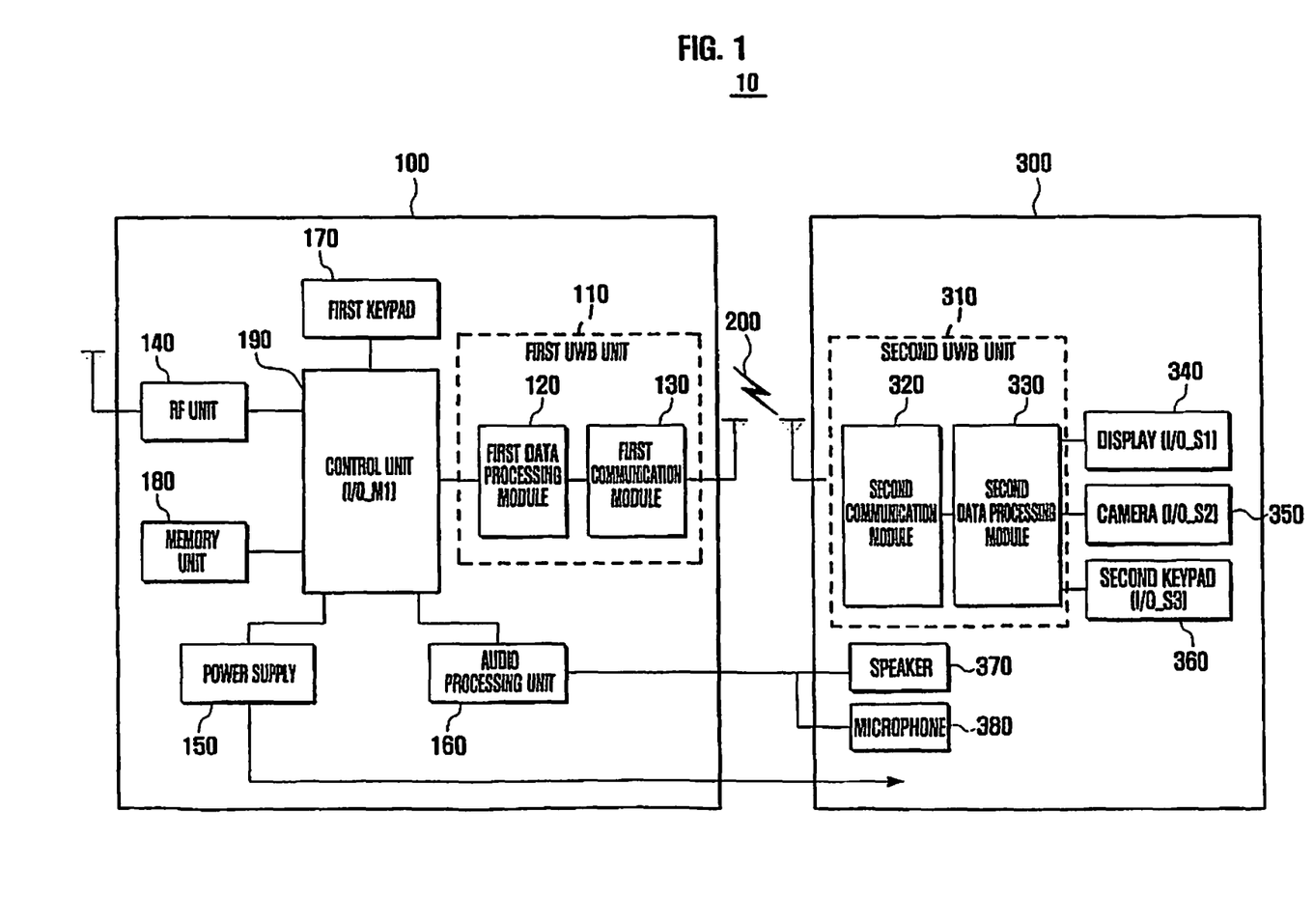
FIG. 1 is a block diagram illustrating a configuration of a mobile terminal employing a UWB coupling mechanism according to the present invention.

Referring to FIG. 1, mobile terminal 10 includes a main unit 100 and a sub-unit 300.

Main unit 100 includes a first UWB unit 110, a radio frequency (RF) unit 140, a power supply 150, an audio processing unit 160, a first keypad 170, a memory unit 180, and a control unit 190. Sub-unit 300 includes a second UWB unit 310, a display 340, a camera 350, a second keypad 360, a speaker 370, and a microphone 380.

First UWB unit 110 includes a first communication module 130 and a first data processing module 120.

First communication module 130 is provided with an antenna for transmitting and receiving data and control packets. First communication module 130 down-converts the signals received through the antenna and up-converts the signals output from first data processing module 120.

First data processing module 120 includes a modem and a codec for performing decompression and decoding on the signals output from first communication module 130 so as to output a packet.

Figure 2:
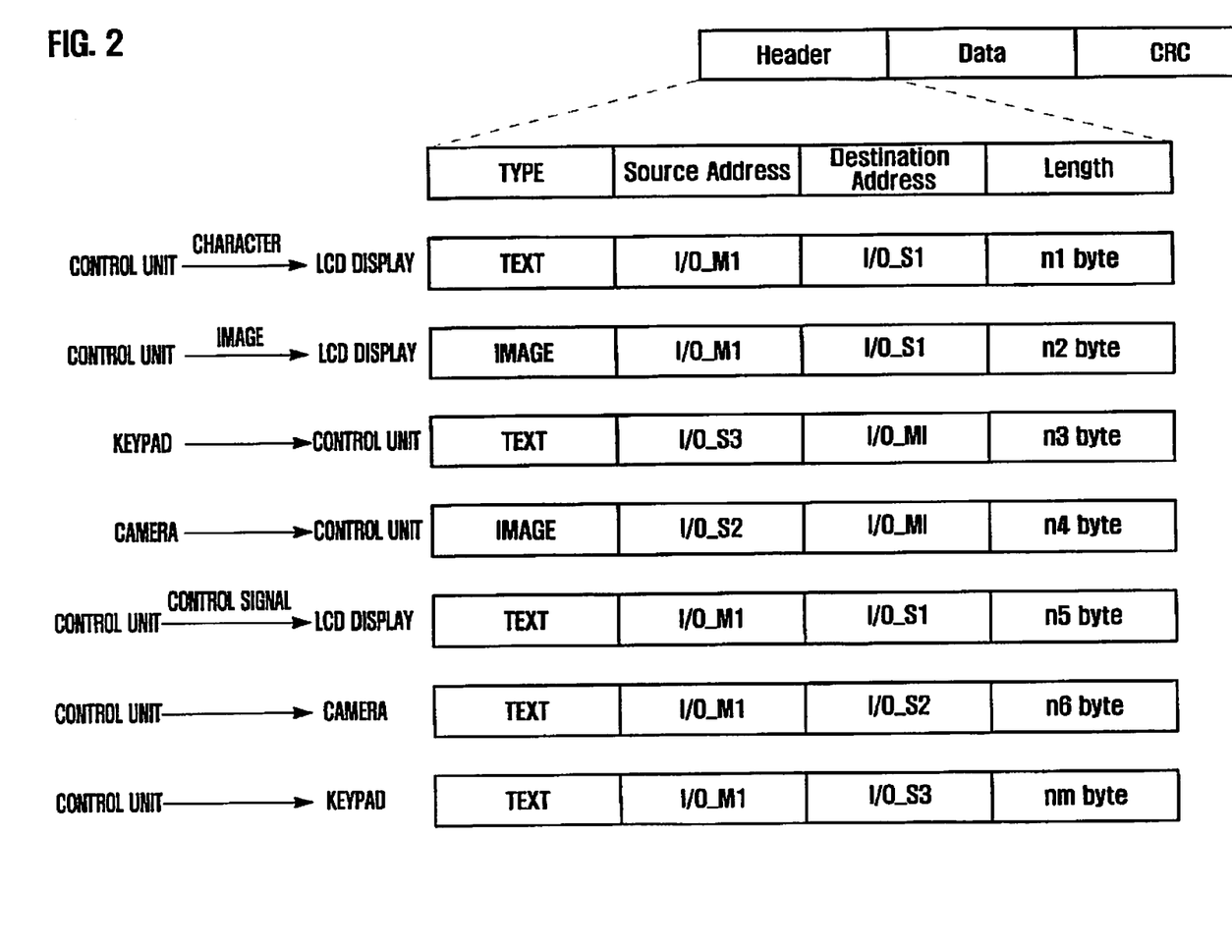
FIG. 2 illustrates the frame format of a packet for use in a UWB coupling mechanism according to the present invention.

Referring to FIG. 2, a packet includes a header containing packet information, a payload containing data, and a cyclic redundancy check (CRC). The header includes a type field indicating a type of the data, a source address field, a destination address field, and a length field for indicating the length of the data. The source and destination addresses are formed in a structure of "Input/Output Device_Main_Unit 1" (I/O_M1) for control unit 190 of main unit 100. In this manner, the addresses of display 340, camera 350, and second keypad 360 of the sub-unit are assigned I/O_S1, I/O_S2, and I/O_S3, respectively. For example, if a packet has a source address of I/O_S2 and a destination address of I/O_M1, the packet is transmitted from camera 350 to control unit 190. The first data processing module 120 performs compression and modulation on a packet to be transmitted from control unit 190 to sub-unit 300 and outputs the processed packet to first communication module 130.

RF unit 140 is responsible for processing cellular communication signals exchanging between the mobile terminal and a base station (not shown). RF unit 140 converts a baseband signal to be transmitted into a radio frequency signal and converts a received radio frequency signal into a baseband signal, and includes an RF transmitter for up-converting and amplifying the baseband signal to be transmitted and an RF receiver for low noise amplifying and down-converting the received radio frequency signal.

Power supply 150 supplies power to the elements constituting the mobile terminal and can be implemented in a fixed or detachable form. Preferably, power supply 150 is implemented with a rechargeable battery such as a nickel battery, nickel-cadmium battery, hydrogen battery, and lithium battery, in consideration of environmental and economic problems.

Audio processing unit 160 is electrically connected to speaker 370 and microphone 380 via a wired link and processes voice signals input through the microphone 380, and from RF unit 140 for output through speaker 370.

First keypad 170 is provided with a plurality of alphanumeric input keys for inputting user data to control unit 190.

Memory unit 180 includes a program region and a data region. The program region stores an operation system for booting mobile terminal 100 and managing general operations of mobile terminal 100, and application programs for executing various multimedia functions. Mobile terminal 100 activates the application programs in response to a user command under the control of control unit 190.

The data region stores application data generated while executing the application. The application data includes still and motion images taken by camera 350, phonebook data, audio data, and other contents.

Control unit 190 controls communication between first UWB unit 110, RF unit 140, power supply 150, audio processing unit 160, first keypad 170, and sub-unit 300. If a packet is received through first UWB unit 110, control unit 190 checks the header of the packet to recognize the source and destination addresses of packet and then reformats the packet to send an element of the destination address. For example, if the source address of the packet is I/O_S3 and the destination address is I/O_M1, control unit 190 recognizes that the packet is transmitted from second keypad 360 of the sub-unit 300. In this case, control unit 190 extracts the data contained in the packet, attaches a new header and CRC, and then transmits the new packet to sub-unit 300. The reformatting process is performed due to the changes of the source and destination address. If an event such as outgoing call or message request, incoming call or message reception, and camera mode button press occurs, control unit 190 activates an I/O device corresponding to the event. For example, if an incoming call is received, control unit 190 outputs a call request signal to display 340 through the UWB link established between first UWB unit 110 and second UWB unit 310 allowing the user to accept or reject receiving the incoming call with reference to the information on display 340. If the incoming call is accepted, an incoming call accept signal is generated by second keypad 360 and transmitted from sub-unit 300 to main unit 100 through the UWB link between first UWB unit 110 and second UWB unit 310, control unit 190 establishes a voice communication channel to a calling party terminal. After establishment of the voice communication channel, control unit 190 controls audio processing unit 160 to process the received voice signal to be output through the speaker as an audible sound and the voice input through microphone 380 to be transmitted to the calling party terminal. Since display 340 has no separate power supply, control unit 190 controls power supply 150 to supply power to sub-unit 300 through a wire link.

Second UWB unit 310 includes a second communication module 320 and a second data processing module 330.

Second communication module 320 is provided with an antenna for transmitting and receiving the data and control packets, and down-converting the signals received through the antenna and up-converting the signals received from second data processing module 330.

Second data processing module 330 includes a modem and a codec for decompressing and decoding the output signals of second communication module 320. The packet has a destination address. For example, if the source address of the packet is I/O_M1 for control unit 190 and the destination address is I/O_S1 for display 340, the packet is transmitted from control unit 190 to display 340. Second data processing unit 330 performs compression and modulation on a signal received from one of display 340, camera 350, and second keypad 360, and then delivers the packet to second communication module 320.

Display 340 presents the characters, numbers, and special symbols input by corresponding keys of the first and second keypads 170 and 360, and displays the image input through camera 350 under the control of control unit 190. Display 340 is connected to power supply 150 through a wire link.

Camera 350 acquires an image and transmits image data representing the image to second data processing module 330. Camera 350 operates in accordance with control signals received from control unit 190 through the UWB link established between first UWB 110 unit and second UWB unit 310.

Second keypad 360 can be provided with additional function keys such as a volume control key and navigation key, call request key, call termination key, etc. Second keypad 360 generates signals corresponding to the keys input by the user and transmits the signal to second data processing module 330 second keypad 360 operates under the control of control unit 190.

speaker 370 outputs the voice data received from another terminal and input through microphone 380 as audible sound and is connected to audio processing unit 160 through a wire link.

Microphone 380 converts the input sound into an electric signal and is connected to audio processing unit 160 through the wire link.

Operations of the UWB coupling mechanism of the above-structured mobile terminal are described hereinafter with reference to FIGS. 3 to 8.

Figure 3:
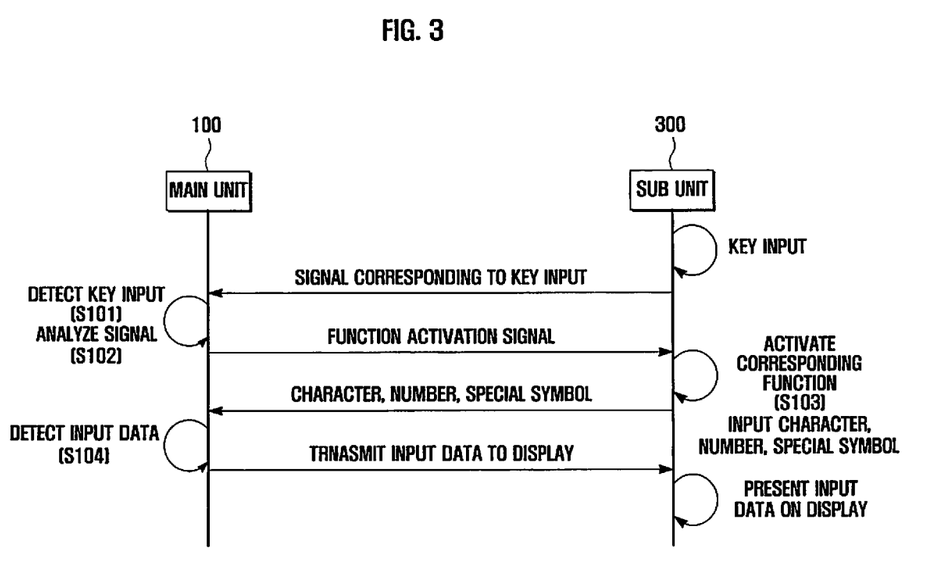
FIG. 3 is a message flow diagram illustrating the operation of a UWB coupling mechanism according to the present invention.

Referring to FIG. 3, if a key is input through second keypad 360 of sub-unit 300 of mobile terminal 10, second keypad 360 generates and transmits a signal corresponding to the key to control unit 190 of main unit 100 of mobile terminal 10 such that control unit 190 detects the key input in step S101 and analyzes the signal in step S102. The key can be a camera mode key, a phonebook activation key, a menu selection key, or a message function key. Next, control unit 190 transmits a function activation signal for activating a function corresponding to the input key to sub-unit 300 so as to activate the corresponding function in step S103. For example, the camera mode key activates camera 350, and the menu selection key presents a menu option on display 340. If characters, numbers, and special symbols are input through second keypad 360, the input data are transmitted to control unit 190, such that control unit 190 recognizes the input data in step S104. Control unit 190 transmits the input data to display 340 for display.

Figure 4:
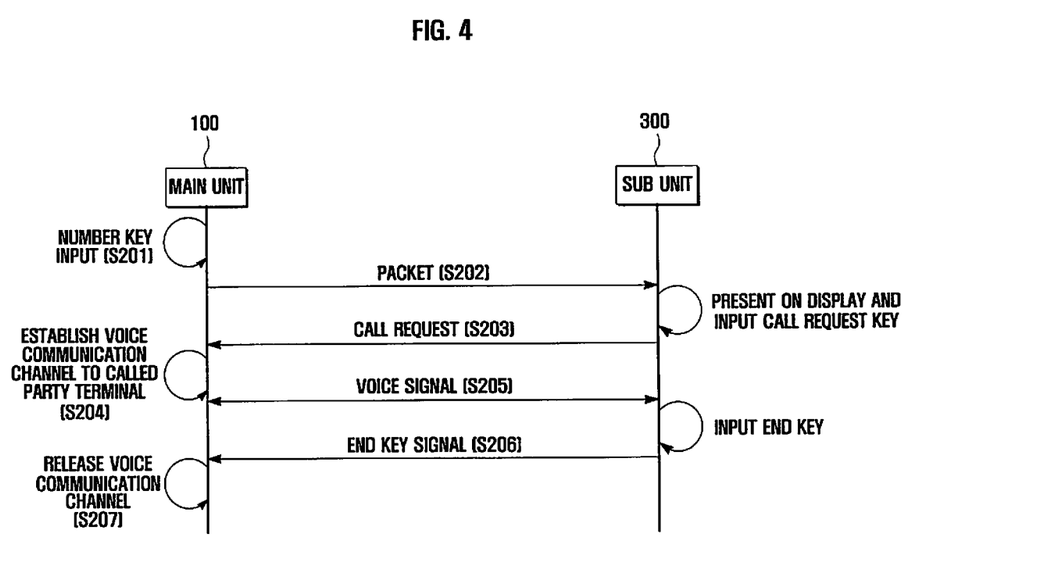
FIG. 4 is a message flow diagram illustrating an outgoing call-related procedure of a UWB coupling mechanism for a mobile terminal according to the present invention.

Referring to FIG. 4, if a number key is input in step S201 through first keypad 170, control unit 190 generates a packet containing the number corresponding to the number key and transmits the packet to display 340 of sub-unit 300 through a UWB link established between the first and second UWB units 110 and 310 in step S202 such that the number is presented on display 340. If a call request key is input through second keypad 360 by the user, an outgoing call request signal is transmitted from sub-unit 300 to main unit 100 through the UWB link in step S203. Next, control unit 190 transmits a call request message to the called party terminal in step S204. If a voice communication channel is established with the called party terminal, control unit 190 transmits an incoming voice signal to speaker 370 through the wire link and transmits an input voice signal through the wire link from microphone 380 to the called party terminal in step S205. If an end key is input through second keypad 360, an end key signal is transmitted to control unit 190 through the UWB link in step S206. Upon receiving the communication end signal, control unit 190 releases the voice communication channel in step S207.

Figure 5:
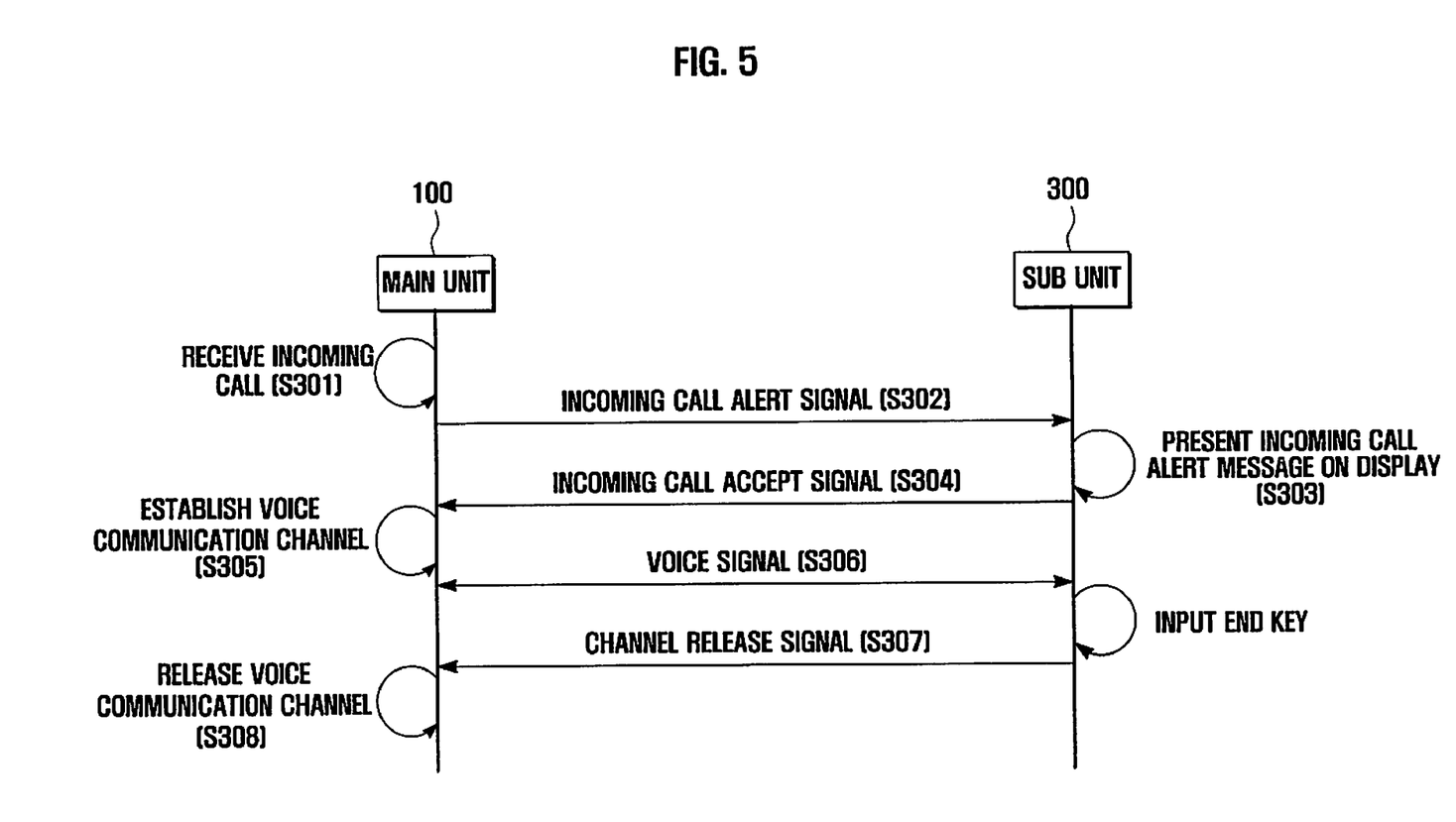
FIG. 5 is a message flow diagram illustrating an incoming call-related procedure of a UWB coupling mechanism for a mobile terminal according to the present invention.

Referring to FIG. 5, if an incoming call is detected in step S301, control unit 190 of main unit 100 transmits an incoming call alert signal to sub-unit 300 through a UWB link established between first UWB unit 110 of main unit 100 and second UWB unit 310 of sub-unit 300 in step S302. Upon receiving the incoming call alert signal, sub-unit 300 presents the incoming call alert message to display 340 and proceeds to scan the key input of second keypad 360 detecting acceptance or rejection of reception of the incoming call in step S303. If an input key accepting the incoming call is detected, an incoming call accept signal is transmitted to main unit 100 in step S304. Upon receiving the incoming call accept signal, control unit 190 establishes a voice communication channel with the called party terminal in step S305. After the voice communication channel is established, control unit 190 transmits a voice signal received from the called party terminal to speaker 370 through the wire link and transmits a voice signal input through the wire link from microphone 380 to the called party terminal in step S306. If an end key is input by the user through second keypad 360 during the voice communication, a channel release signal is transmitted to main unit 100 through the UWB link in step S307. Upon receiving the channel release signal, control unit 190 of main unit 100 controls release of the voice communication channel in step S308.

Figure 6:
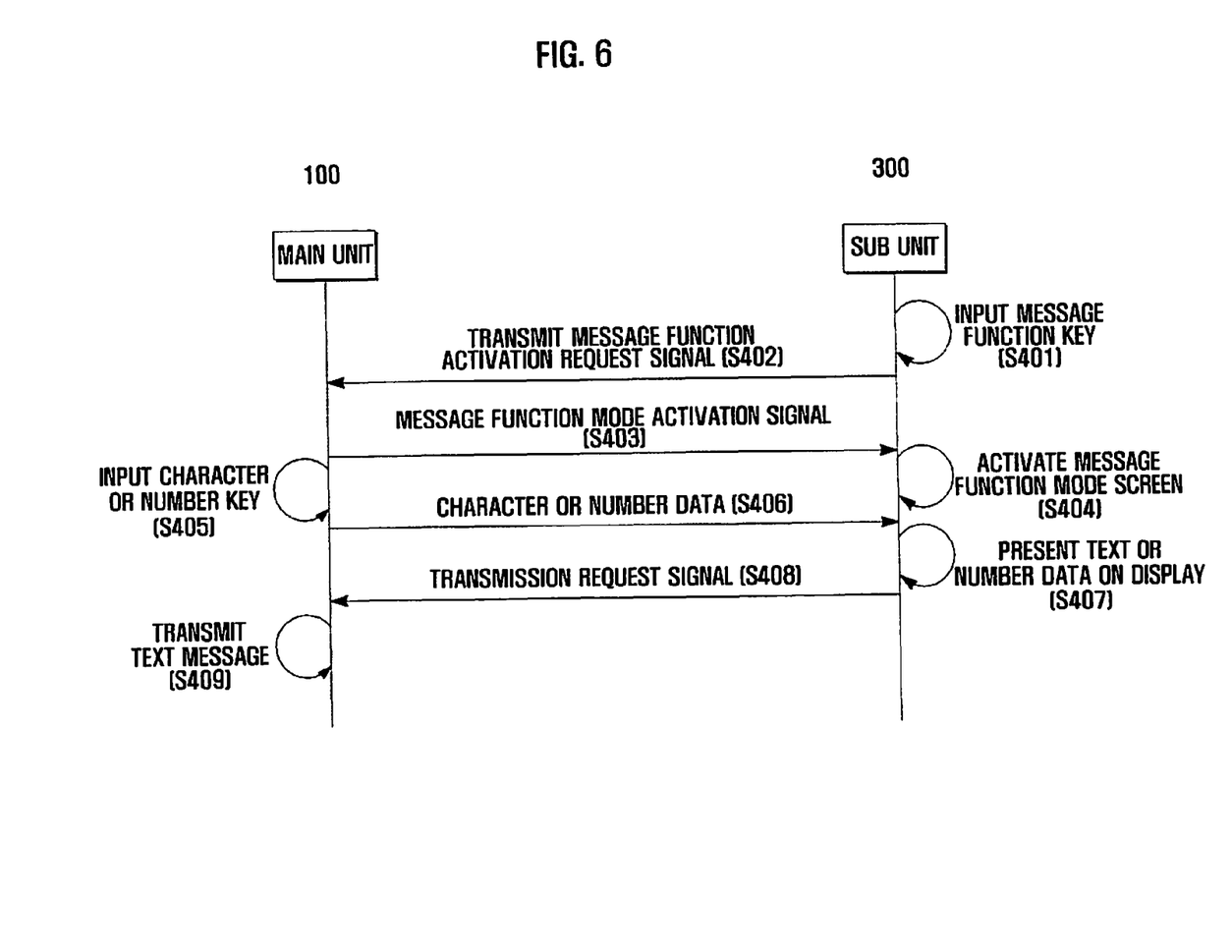
FIG. 6 is a message flow diagram illustrating an outgoing text message-related procedure of a UWB coupling mechanism for a mobile terminal according to the present invention.

Referring to FIG. 6, a message function key is input through second keypad 360 of sub-unit 300 in step S401 such that a message function activation request signal is transmitted to main unit 100 through the UWB link established between first UWB unit 110 and second UWB unit 310 in step S402. In response to the message function activation request signal, control unit 190 transmits a message function activation enable signal to sub-unit 300 through the UWB link in step S403 such that a message function mode screen is activated on display 340 of sub-unit 300 in step S404. If at least one character, number, or special symbol key is input through first keypad 170 in step S405 while the message function mode screen is activated, control unit 190 generates a packet containing a string of the input keys and a destination address I/O_S1 indicating display 340 and transmits the packet to sub-unit 300 through the UWB link in step S406, whereupon sub-unit 300 displays the string of the input keys on display 340 and detects a send key input through second keypad 360 in step S407. If the send key is detected, a transmission request signal is sent to main unit 100 through the UWB link in step S408. Upon receiving the transmission request signal, control unit 190 of main unit 100 transmits the string of keys to a called party terminal in step S409.

Figure 7:
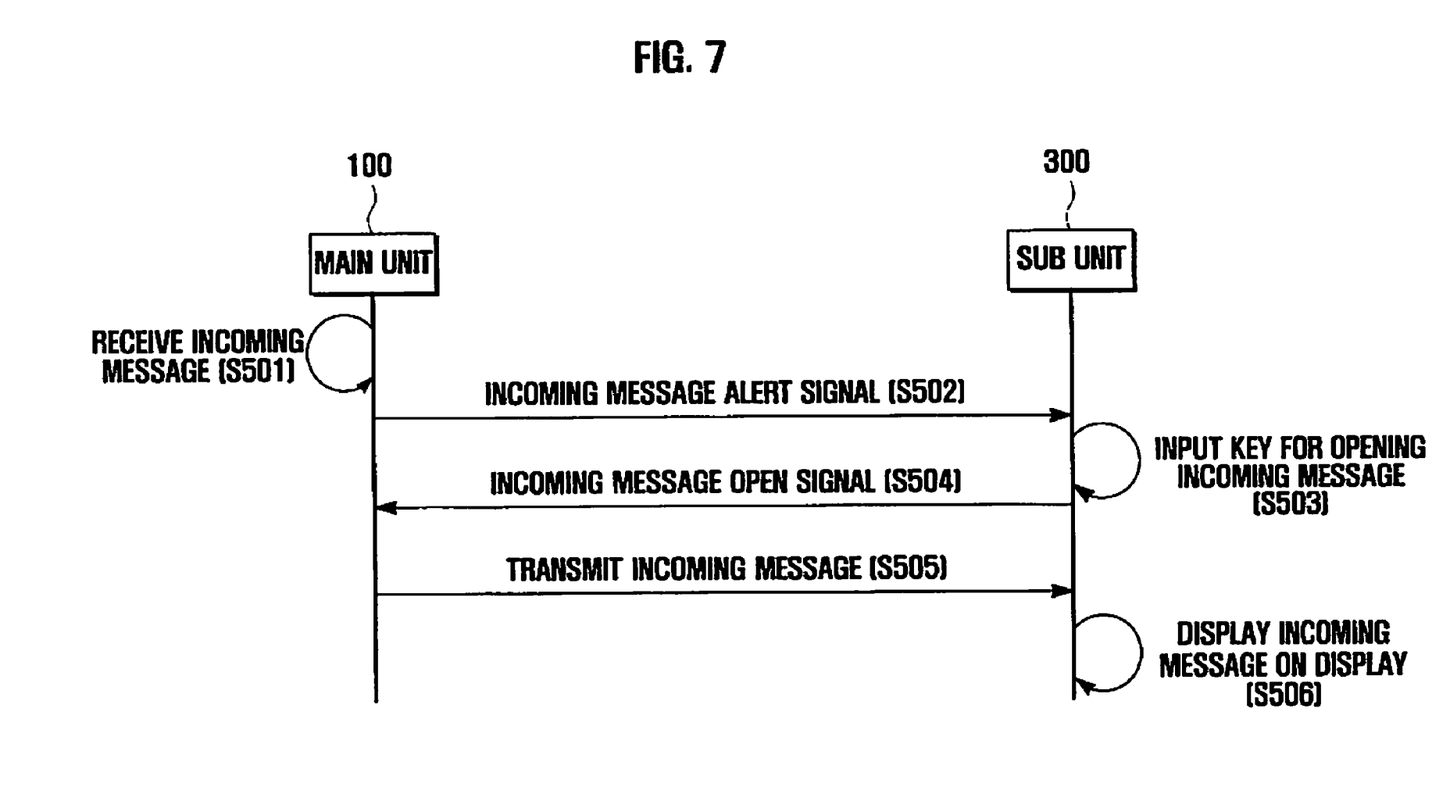
FIG. 7 is a message flow diagram illustrating an incoming text message-related procedure of a UWB coupling mechanism for a mobile terminal according to the present invention.

Referring to FIG. 7, if an incoming message is received from a calling party terminal through a cellular communication channel in step S501, control unit 190 of main unit 100 transmits an incoming message alert signal to sub-unit 300 through the UWB link established between first UWB unit 110 of main unit 100 and second UWB unit 310 of sub-unit 300 in step S502 such that an incoming message alert is presented on display 340. Using second keypad 360 in step S503, if the user activates a key for opening the incoming message while the incoming message alert is e displayed, an incoming message open signal is transmitted to main unit 100 through the UWB link in step S504. Upon receiving the incoming message open signal, control unit 190 of main unit 100 transmits the incoming message to sub-unit 300 through the UWB link in step S505 and the sub-unit 300 presents the incoming message on display 340 in step S506.

Figure 8:
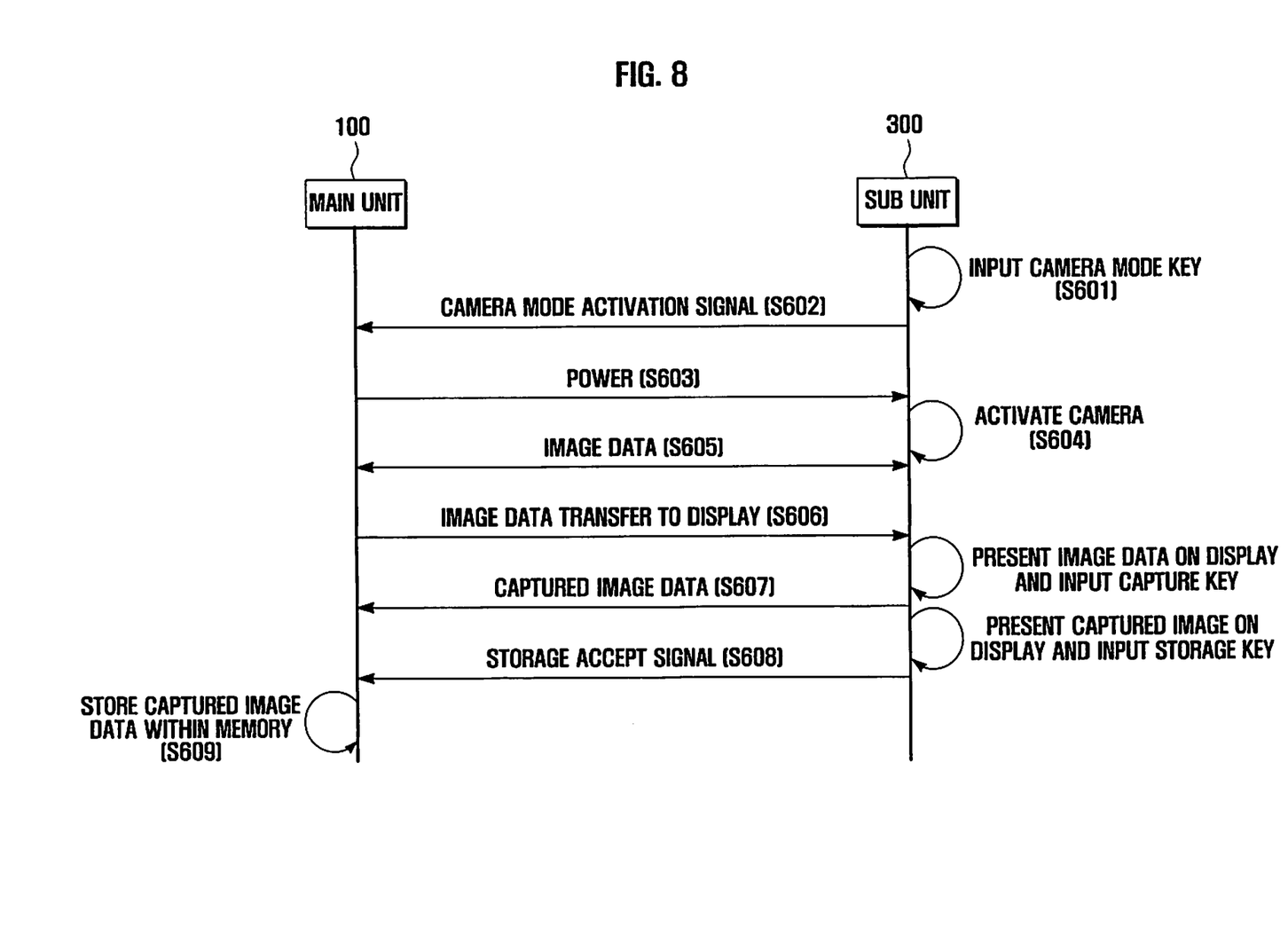
FIG. 8 is a message flow diagram illustrating a camera mode-related procedure of a UWB coupling mechanism for a mobile terminal according to present invention.

Referring to FIG. 8, if a camera mode key is input through second keypad 360 of sub-unit 300 in step S601, a camera mode activation signal is transmitted to main unit 100 through the UWB link established between first UWB unit 110 of main unit 100 and second UWB unit 310 of sub-unit 300 in step S602. Upon receiving the camera mode activation signal, control unit 190 controls to supply power to camera 350 in step S603 such that the camera is activated in step S604. When camera 350 is activated, the image data taken by camera 350 is transmitted to main unit 100 through the UWB link in step S605. Control unit 190 of main unit 100 forwards the image data to display 340 through the UWB link in step S606 and the image data are displayed on display 340. If a capture key is input while displaying the image data, an image is captured at the time that the capture key is input and then transmitted to main unit 100 through the UWB link in step S607. Control unit 190 controls such that the captured image is presented on display 340 together with a storage alert for allowing the user to save or discard the captured image. If a save key is input by the user for storing the captured image, a storage accept signal is transmitted to the main unit through the UWB link in step S608. Upon receiving the storage accept signal, control unit 190 stores the captured image within memory unit 180 in step S609.

As described above, a UWB coupling mechanism enables two parts of the mobile terminal to exchange signals through a wireless UWB link, thereby avoiding physical damage of the inner signaling channel of the mobile terminal, which would prevent the mobile phone from functioning properly due to unreliable signaling.

Also, since the UWB coupling mechanism connects separate parts of the mobile terminal through the wireless channel rather than through a conventional FPCB or cable, it is possible to simplify the manufacturing process of the mobile terminal.

Although exemplary embodiments of the present invention are described in detail hereinabove, it should be clearly understood by an artisan of ordinary skill in the art that many variations and/or modifications of the basic inventive concepts herein taught may be made that still fall within the spirit and scope of the present invention, as further defined by the appended claims.

What is claimed is:

1. A mobile terminal comprising:
 a main unit having an input unit, a first short range communication unit, a memory for storing data received or to be transmitted through the first short range communication unit, a radio frequency unit for establishing a radio channel with a mobile communication system, and a control unit for controlling communication between the first short range communication unit, memory, and radio frequency unit; and
 a sub-unit having a second short range communication unit for establishing a wireless channel to the first short range communication unit, and having a plurality of function units for executing various functions of the mobile terminal,
 wherein one of the plurality of function units transmits a message having a source address as an address of the function unit and a destination address as an address of the control unit through the wireless channel,
 wherein the control unit receives the message, analyzes the message based on the source address of the message, formats the message, and transmits the formatted message having the address of the control unit as a source address of the formatted message and an address of a corresponding function unit according to the source address of the message as a destination address of the formatted message through the wireless channel, and
 wherein the corresponding function unit receives and processes the formatted message.

2. The mobile terminal of claim 1, wherein the plurality of function units include at least one of a keypad, a display, a microphone, a speaker, and a camera.

3. The mobile terminal of claim 1, wherein the main unit further comprises a power supply for supplying power to elements of the main unit and the sub-unit, an audio processing unit for processing an audio signal, and a first wire interface for transmitting power from the power supply and the audio signal to the sub-unit; and the sub-unit further comprises a second wire interface for receiving the power and the audio signal.

4. An intra-wireless coupling method for a mobile terminal including a main unit and a sub unit, the main unit having a first short range wireless communication unit, a memory unit, a radio frequency unit, and a control unit; and the sub-unit having a second short range wireless communication unit and a plurality of function units for activating and executing various functions under the control of the control unit, the method comprising:
 transmitting external data signals and control signals having an address of one of the plurality of function units of the sub-unit as a source address and an address of the control unit of the main unit as a destination address through a wireless channel established between the first and second short range wireless communication units;
 analyzing the data and control signals based on the source address;
 formatting the data and control signals; and
 transmitting the formatted data and control signals having an address of a corresponding function unit according to the source address as a destination address of the formatted data and control signals and having the address of the control unit as a source address of the formatted data and control signals through the wireless channel; and
 processing the formatted data and control signals.

5. The intra-wireless coupling method of claim 4, further comprising:
 receiving a data signal from the input unit of the main unit; and
 transmitting the data signal having the address of the control unit of the main unit as a source address and an address of one of the plurality of the function units as a destination address.

6. The intra-wireless coupling method of claim 4, wherein the plurality of function units includes at least one of a keypad, a display, a microphone, a speaker, and a camera.

7. The intra-wireless coupling method of claim 4, wherein the main unit further comprises a power supply for supplying power to elements of the main unit and the sub-unit, an audio processing unit for processing an audio signal, and a first wire interface for transmitting power from the power supply and the audio signal to the sub-unit; and the sub-unit further comprises a second wire interface for receiving the power and the audio signal.

8. The mobile terminal of claim 1, wherein the formatted message is a function activation message.

9. The mobile terminal of claim 8, wherein the corresponding function unit processes the formatted message by executing a function based on the formatted message.

10. The intra-wireless coupling method of claim 4, wherein processing the formatted data and control signal includes executing, by the corresponding function unit, a function based on the formatted data and control signal.

* * * * *